(12) United States Patent
Rahman et al.

(10) Patent No.: US 12,376,172 B2
(45) Date of Patent: Jul. 29, 2025

(54) CALL SETUP FOR EVOLVED PACKET SYSTEM FALLBACK

(71) Applicant: T-Mobile USA, Inc., Bellevue, WA (US)

(72) Inventors: Muhammad Tawhidur Rahman, Bellevue, WA (US); Chun Keet Foong, Whitesboro, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 582 days.

(21) Appl. No.: 17/700,343

(22) Filed: Mar. 21, 2022

(65) Prior Publication Data

US 2023/0300931 A1    Sep. 21, 2023

(51) Int. Cl.
*H04W 76/18*     (2018.01)
*H04L 65/1016*   (2022.01)
*H04L 65/1045*   (2022.01)
*H04L 65/1104*   (2022.01)
*H04W 4/12*      (2009.01)

(52) U.S. Cl.
CPC ......... *H04W 76/18* (2018.02); *H04L 65/1016* (2013.01); *H04L 65/1045* (2022.05); *H04L 65/1104* (2022.05); *H04W 4/12* (2013.01)

(58) Field of Classification Search
CPC ............. H04L 65/1069; H04L 65/1104; H04L 65/1016; H04L 65/1045; H04W 36/302; H04W 76/12; H04W 76/15; H04W 36/00698; H04W 76/18; H04W 4/12; H04W 76/16

See application file for complete search history.

(56) References Cited

U.S. PATENT DOCUMENTS

| | | | |
|---|---|---|---|
| 2009/0047922 A1* | 2/2009 | Buckley | H04W 4/02 455/404.1 |
| 2010/0177771 A1* | 7/2010 | Buckley | H04W 76/12 370/352 |
| 2019/0190997 A1* | 6/2019 | Sabeur | H04L 65/1104 |
| 2019/0208393 A1* | 7/2019 | Bakker | H04L 65/1069 |
| 2020/0112887 A1* | 4/2020 | Kwok | H04W 36/302 |
| 2020/0314702 A1* | 10/2020 | Rahman | H04W 36/00698 |
| 2020/0323008 A1* | 10/2020 | Pal | H04W 36/0022 |
| 2021/0007026 A1* | 1/2021 | Kho | H04W 88/18 |
| 2023/0217520 A1* | 7/2023 | Wei | H04W 76/15 455/418 |

* cited by examiner

*Primary Examiner* — Vinncelas Louis
(74) *Attorney, Agent, or Firm* — Lee & Hayes, P.C.

(57) ABSTRACT

Techniques for setting up a communication session associated with Evolved Packet System Fallback (EPSFB) are described herein. A fifth generation telecommunications network can implement a server to determine that a user equipment (UE) is incapable of establishing a Voice over New Radio (VoNR) call due to a chipset or other technology used by the UE. The server can send a message (e.g., a SIP380 Alternative Service message) to the UE to cause the UE to begin fallback to another network without waiting for an instruction from a base station in a standardized call flow. The server can establish the communication session for the UE using fewer call flow steps than a number of steps used by a standardized call flow.

20 Claims, 6 Drawing Sheets

CALL SETUP FOR EVOLVED PACKET SYSTEM FALLBACK

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Telecommunications systems may include fifth generation (5G) cellular-wireless access technologies to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

User Equipment (UE) can fallback from a 5G network to a 4G network for a variety of reasons. For instance, a UE can operate on a 5G standalone (5G SA) network but be unable to complete a voice call because the UE is not compatible to use Voice over New Radio (VoNR). Fallback to the 4G network currently requires exchanging messages between the 5G network, the UE, and the 4G network using a standardized call flow. However, exchanging messages using the standardized call flow takes time and can lead to call drops, delays, or customer dissatisfaction.

This application relates to techniques for setting up a communication session associated with Evolved Packet System Fallback (EPSFB). The communication setup techniques can include a 5G telecommunications system implementing a server that determines technological capabilities of a UE attempting to establish a VoNR communication. For example, the server can receive a message from the UE requesting a communication session and compare device information associated with the UE to a list of devices that are not compatible with VoNR due to a chipset or other technology used by the UE. When VoNR is not supported by the UE, for example, due to a technological deficiency of the UE, the server can send a message to the UE to initiate a EPSFB call flow that replaces at least a portion of a standard-based call setup procedure. By implementing the server to perform the functionality described herein, a communication session can be established in less time and with a higher success rate (fewer dropped calls) relative to standard-based approaches. Further, the techniques can include exchanging fewer messages to complete EPSFB versus a standardized call setup procedure thereby increasing network capacity available to make VoNR calls.

Generally, the server can represent functionality to generate, manage, and exchange messages that establish a communication session during EPSFB (also referred to as fallback). For instance, the server of the 5G telecommunication network can receive a call setup request message from a UE, and implement a call flow (e.g., a set of messages) to establish and maintain a communication session with another UE. The server can represent firmware, hardware and/or software that receives an initial call setup request (e.g., a Session Initiation Protocol (SIP) INVITE message) to establish a voice communication (e.g., a Voice over New Radio (VoNR) voice call or a VoNR emergency call) and analyzes the initial call setup request to determine that fallback in inevitable due to limitations of the UE (e.g., the chipset does not support VoNR, etc.). In some examples, the server can generate a message (e.g., an alternative service message such as a SIP380 message) for sending to the UE to initiate fallback. The server can send the message to the UE after determining that the UE lacks the software, hardware, and/or firmware to establish a VoNR call.

In some examples, the server can represent a Proxy Call Session Control Function (PCSCF) of an IP Multimedia Subsystem (IMS) core configured to identify device information (e.g., a PANI, an IMEI, etc.) associated with a voice call request from a UE, and determine that the UE is unable to complete a VoNR call. For example, the server can determine whether a radio channel, a radio technology, and/or a chipset of the UE is sufficient for establishing a VoNR call. The PCSCF can initiate a call flow to cause the voice call to fallback to a 4G network using fewer steps (data exchanges) than a standardized call flow. In various examples, the server can pause, delay, or otherwise manage potentially conflicting messages associated with a standardized call flow (e.g., a standard developed by an organization such as a $3^{rd}$ Generation Partnership Project (3GPP)).

The PCSCF can determine that the UE does not support VoNR on a 5G network in a variety of ways. In some examples, the PCSCF can extract device information from a SIP INVITE message received from the UE as part of a voice call setup request. The PCSCF can compare the device information (e.g., data indicating a type of handset, computational resources, available radio technologies, etc.) to a list of devices that require fallback due to technological limitations of the UE. In such examples, the PCSCF can send a message (e.g., a SIP380 Alternative Service message) to the UE to cause the UE to begin fallback to the 4G network without waiting for an instruction from a base station of the 5G network as in standardized call setup examples. For example, information in the SIP380 message fields can instruct the UE to scan the 4G network for available radio channels or indicate a particular radio channel (e.g., 600 Mhz, or other frequency) to use on the 4G network. In this way, the server can cause the UE to initiate fallback sooner without otherwise waiting for an indication of fallback resultant from using standard-based approaches.

In some examples, the server can generate one or more message(s) for sending to a base station of the 5G network, a base station of the 4G network, an Access and Mobility Management Function (AMF), and/or an Session Management Function (SMF), just to name a few. The one or more messages can ensure that the base station of the 5G network, the base station of the 4G network, the AMF, and/or the SMF exchange data efficiently while also avoiding potential conflicts with some standardized call setup messages. For example, the server can generate a message for sending to the SMF that causes the SMF to delay processing for a period of time so that the SMF does not process one or more messages (e.g., generate a message, respond to a message, etc.) associated with the standardized call flow. By delaying the SMF processes for a short time (e.g., 100 milliseconds to 3000 milliseconds), conflicts between the standardized call flow and the call flow initiated by the PCSCF can be avoided.

As mentioned, the server can establish EPSFB using fewer message exchanges than standardized approaches. For example, the server can manage fallback for incompatible UEs to the 4G network more quickly than current approaches by recognizing UEs that lack technology to complete a 5G voice call. By exchanging fewer messages to establish a communication session, additional bandwidth is available on the 5G network. Further, using the techniques described herein reduces an amount of dropped calls during EPSFB. Further description of communication setup techniques by the server can be found throughout this disclosure including in the figures below.

Figure 1:
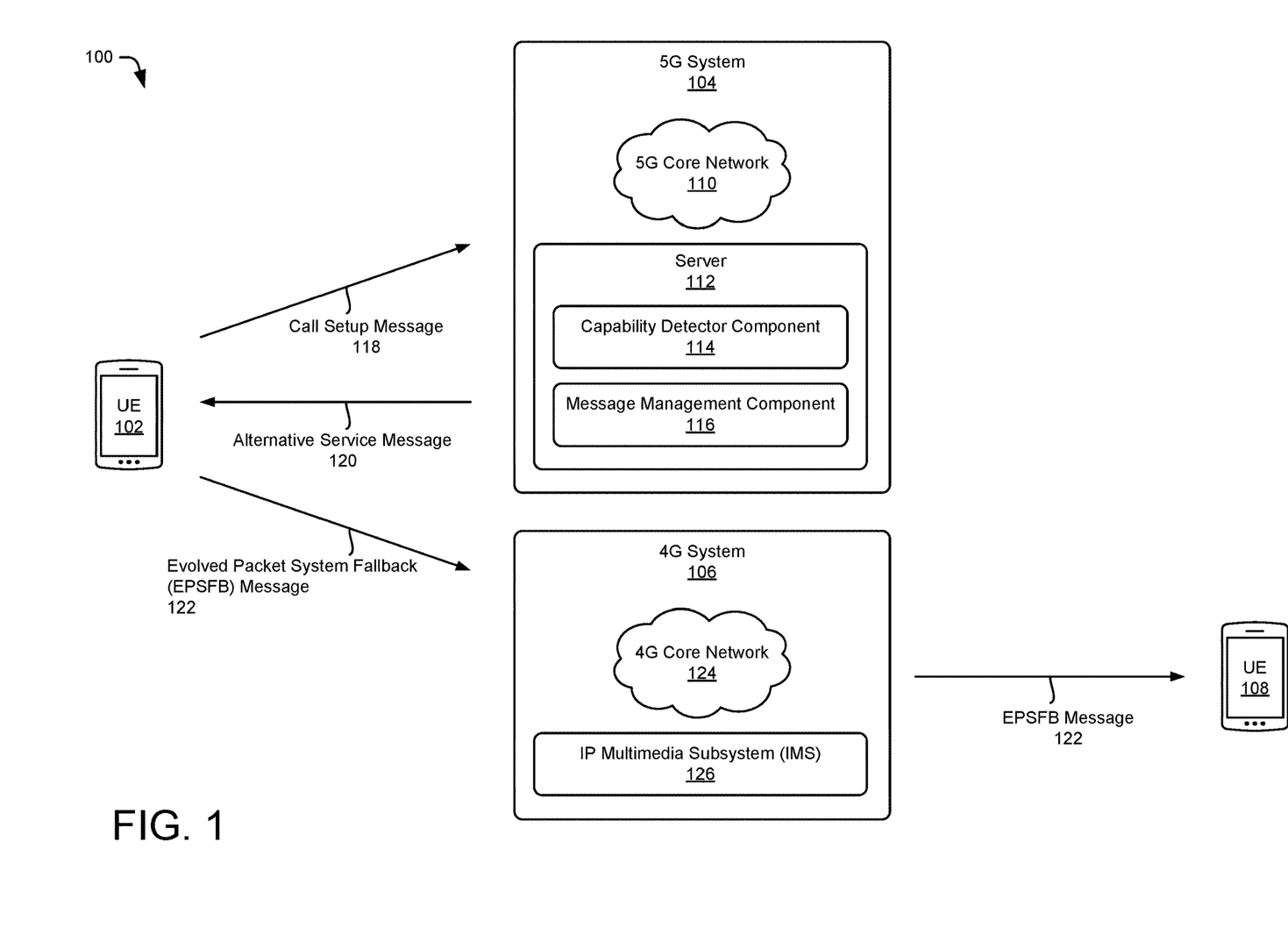
FIG. 1 depicts an example network environment in which an example user equipment (UE) can connect to one of multiple available telecommunications systems to engage in a voice communication.

FIG. 1 depicts an example network environment 100 in which an example user equipment (UE) can connect to one of multiple available telecommunications systems to engage in a voice communication. For example, a UE 102 can connect to a 5G system 104 or a 4G system (LTE) 106 to exchange a voice communication (e.g., a VoNR communication, an e911 voice communication, etc.) with one or more additional UEs (e.g., UE 108).

The UE 102 and the UE 108 represent any device that can wirelessly connect to the telecommunication network, and in some examples may include a mobile phone such as a smart phone or other cellular phone, a personal digital assistant (PDA), a personal computer (PC) such as a laptop, desktop, or workstation, a media player, a tablet, a gaming device, a smart watch, a hotspot, a Machine to Machine device (M2M), a vehicle, an unmanned aerial vehicle (UAV), an Internet of Things (IoT) device, or any other type of computing or communication device. An example architecture for the UE 102 and UE 108 is illustrated in greater detail in FIG. 7.

As depicted in FIG. 1, the 5G system 104 comprises a 5G core network 110 and a server 112 to establish a communication session between the UE 102 and the UE 108 using fewer call flow steps than a number of steps used by the standardized call flow. Generally, the server 112 can represent an IP Multimedia Subsystem (IMS), or component thereof such as a PCSCF. To implement the call setup techniques described herein, the server 112 can implement a capability detector component 114 and a message management component 116. For example, the UE 102 can initiate a call setup procedure (e.g., an exchange of a plurality of messages that establish the communication channel) by sending a call setup message 118 to establish a voice call to the 5G system 104. The server 112 can generate an alternative service message 120 for sending to the UE 102 to indicate that the call will be setup on the 4G system 106. Based at least in part on receiving the alternative service message 120, the UE 102 can generate a EPSFB message 122 that initiates establishing a communication session with the UE 108.

FIG. 1 also depicts the 4G system 106 comprising a 4G core network 124 and an IP Multimedia Subsystem (IMS) 126 (e.g., an IMS core network) for transmitting and/or receiving messages (e.g., the EPSFB message 122) with the UE 102.

The capability detector component 114 can represent functionality to intercept the call setup message 118 (e.g., a SIP INVITE message as part of a voice call setup request) and extract, detect, or otherwise determine device information associated with the UE 102. Generally, the capability detector component 114 can identify, detect, or otherwise determine that the UE 102 is requesting a voice call (e.g., a Voice over New Radio (VoNR) communication over the 5G core network 110). For example, the capability detector component 114 can identify a P-Access-Network-Information (PANI), an International Mobile Equipment Identity (IMEI), or other device identifier, associated with the UE 102 usable to identify a capability of the UE 102 for communicating over the 5G system 104 and/or the 4G system 106. In various examples, the capability detector component 114 can compare the device information (e.g., the PANI, the IMEI, etc.) to a table, a list, or other data stored in memory that identifies a chipset, a radio frequency, or other capability of the UE 102, and determine, based on the comparing, that the UE 102 is incapable of completing a voice call over the 5G core network 110.

In some examples, the capability detector component 114 can extract the PANI from the call setup message 118 and determine, based at least in part on the PANI, a radio access technology usable by the UE 102. The capability detector component 114 can also or instead extract the IMEI to determine an identity or device type of the UE 102. The capability detector component 114 can access data (e.g., a list, a table, a capability map, and the like) indicating which UEs require fallback based on technology associated with the PANI and/or the IMEI. The data can be accessed from a memory, a database, or other storage device, and is updatable by the server 112 to include devices with chipsets, software, or other hardware that do not support a voice call over the 5G core network 110. Accordingly, data is available for access by the capability detector component 114 for comparing device information from the UE 102, regardless of a model or manufacturer of the device.

Based at least in part on the device information indicating that the UE 102 is unable to establish a VoNR call, the message management component 116 can generate the alternative service message 120 indicating that the UE 102 is to initiate EPSFB to the 4G core network 124. The alternative service message 120 can represent a message sent in association with a cause code such as intermediate/temporary cause codes in the 3XX range (e.g., a SIP380 Alternative Service message). The UE 102 can interpret instructions in the alternative service message 120 (e.g., access and interpret information elements of the SIP380 Alternative Service message). The information elements can indicate that the UE 102 will require fallback to establish the call, request that the UE 102 initiate the fallback, indicate a radio frequency for using to establish the communication session, request that the UE 102 scan for available frequencies on the 4G core network 124, among others. For instance, responsive to receiving the alternative service message 120, the UE 102 can initiate a scan of available radio frequencies on the 4G core network 124, use a predetermined radio frequency, or otherwise begin fallback without waiting for an instruction from a base station of the 5G system 104 as in standardized call setup procedures (e.g., EPSFB call setup procedures determined by a standard organization).

In some examples, the capability detector component 114 can determine information about a base station (e.g., a gNB) or other network element used to send the call setup message 118 from the UE 102 to the server 112. For instance, the capability detector component 114 can detect a cell global identity (CGI) associated with the call setup message 118 and determine radio frequencies available to the base station based at least in part on the CGI. In such examples, the alternative service message 120 can further indicate which radio frequencies that the UE 102 can access.

In addition to generating the alternative service message 120, the message management component 116 can generate, manage, or otherwise determine one or more messages usable to establish EPSFB. In some examples, the message management component 116 can generate a message for sending to an AMF, SMF, PCF, a base station, or other entity of the 5G system 104, in order to coordinate a series of messages that together establish the communication session. In some examples, the message management component 116 can generate a message to notify a base station that the UE 102 will fallback to the 4G system 106 so that the base station is made aware of the fallback before exchanging a series of standardized messages in a standardized call setup procedure.

In some examples, the message management component 116 can pause, delay, and/or refrain from processing a message associated with a standardized call setup procedure. By way of example and not limitation, the message management component 116 can send a message to the SMF to cause the SMF to delay processing of a message(s) until expiration of a time period to avoid a potential conflict with the UE 102 initiating fallback as a result of receiving the alternative service message 120.

In various examples, the message management component 116 can pause generating or sending a call setup instruction associated with a standardized call setup procedure for a time period. For example, the message management component 116 can pause a message intended for sending to a base station of the 5G system 104 for the time period (e.g., less than a few hundred milliseconds) based at least in part on identifying or detecting that the UE 102 is initiating fallback as a result of receiving the alternative service message 120.

During pausing of the call setup instruction from being processed by the IMS of the 5G system 104, the server 112 and/or the UE 102 can determine a signal strength and/or a signal quality of one or more radio frequency bands of the 4G core network 124. In some examples, the UE 102 can receive a test result(s) that comprises a strength measurement of available radio frequency bands in association with the EPSFB message 122. The test result(s) can be received from a component of the UE 102 (e.g., a modem, a memory, an IMS, etc.) that stores measured test data as a result of performing a test. In some examples, the test results can include, for example, one or more of: a Reference Signal Received Power measurement, a Received Signal Strength Indicator measurement, or a Reference Signal Received Quality measurement.

The IMS 126 of the 4G system 106 is configured to generate, communicate, or otherwise establish a communication session usable for the UE 102 to exchange a voice call or other data with another UE (e.g., the UE 108). In various examples, the 4G system 106 can initiate, establish, maintain, format, augment, manage, or otherwise determine secure exchange of text, video, and/or photos including configuring the EPSFB message 122 to communicate with the UE 108.

In various examples, the techniques described herein can include the server 112 implementing a timer for a time period to delay sending one or more call setup instructions to the AMF, the SMF, the PCF, or other component of the IMS of the 5G system 104. For instance, the time period can begin upon the server 112 sending the alternative service message 120 to the UE 102. By implementing the timer, the UE 102 has time to exchange messages with a base station and/or an IMS of the 5G system 104 and/or the 4G system 106 without standardized messages being generated by the SMF, PCF, etc. At the end of the time period, the server 112 can commence processing messages with the SMF, PCF, etc. to establish a voice call user plane. In various examples, at least some standardized messages may be exchanged between the UE 102 and the server 112 after completion of the time period.

In some examples, the time period can vary over time based at least in part on analysis of previous time periods by a machine learned model trained to minimize an amount of time that the server 112 waits before sending the call setup instruction(s). Using a machine learned model to determine the time period can reduce the time period and therefore minimize an ability for the user of the UE 102 to perceive the delay. In other words, the server 112 can adjust the time period over time to account for accessing and/or performing various tests while the UE initiates fallback. In some examples, the machine learned model can identify which tests provide the best indication of a possible change of service, and determine the time period based on the identified tests.

To implement the techniques described herein, in various examples the 5G system 104 and/or the server 112 can include one or more of: an a proxy call session control function (PCSCF), an interrogating call session control function (ICSCF), a serving call session control function (SCSCF), a serving gateway (SGW), a packet data network gateway (PGW), a policy and charging rules function (PCRF), and an internet protocol short message gateway (IPSM-GW), a short message service center (SMSC), and an evolved packet data gateway (ePDG) 328, and a Home Subscriber Server (HSS), just to name a few. In addition, the techniques described herein may be implemented using Real-Time Protocol (RTP) and/or Real-Time Control Protocol (RTCP), among others.

In various examples, the 5G system 104 can represent functionality to provide communications between the UE 102 and the UE 108, and can include one or more radio access networks (RANs), as well as one or more core networks linked to the RANs. For instance, a UE 102 can wirelessly connect to a base station or other access point of a RAN, and in turn be connected to the 5G core network 110. The RANs and/or core networks can be compatible with one or more radio access technologies, wireless access technologies, protocols, and/or standards. For example, wireless and radio access technologies can include fifth generation (5G) technology, Long Term Evolution (LTE)/LTE Advanced technology, other fourth generation (4G) technology, third generation (3G) technology, High-Speed Data Packet Access (HSDPA)/Evolved High-Speed Packet Access (HSPA+) technology, Universal Mobile Telecommunications System (UMTS) technology, Global System for Mobile Communications (GSM) technology, WiFi technology, and/or any other previous or future generation of radio access technology. In this way, the 5G system 104 is compatible to operate with other radio technologies including those of other service providers. Accordingly, the call setup message 118 from the UE 102 may originate with another service provider (e.g., a third-party) and be processed by the IMS independent of the technolog(ies) or core network associated with the service provider.

In some examples, the 5G core network 110 can represent a service-based architecture that includes multiple types of network functions that process control plane data and/or user plane data to implement services for the UE 102. In some examples, the services comprise rich communication services (RCS), a VoNR service, a ViNR service, and the like which may include a text, a data file transfer, an image, a video, or a combination thereof. The network functions of the 5G core network 110 can include an Access and Mobility Management Function (AMF), a Session Management Function (SMF), a User Plane Function (UPF), a Policy Control Function (PCF), and/or other network functions implemented in software and/or hardware, just to name a few. Examples of network functions are also discussed in relation to FIG. 2, and elsewhere.

Figure 2:
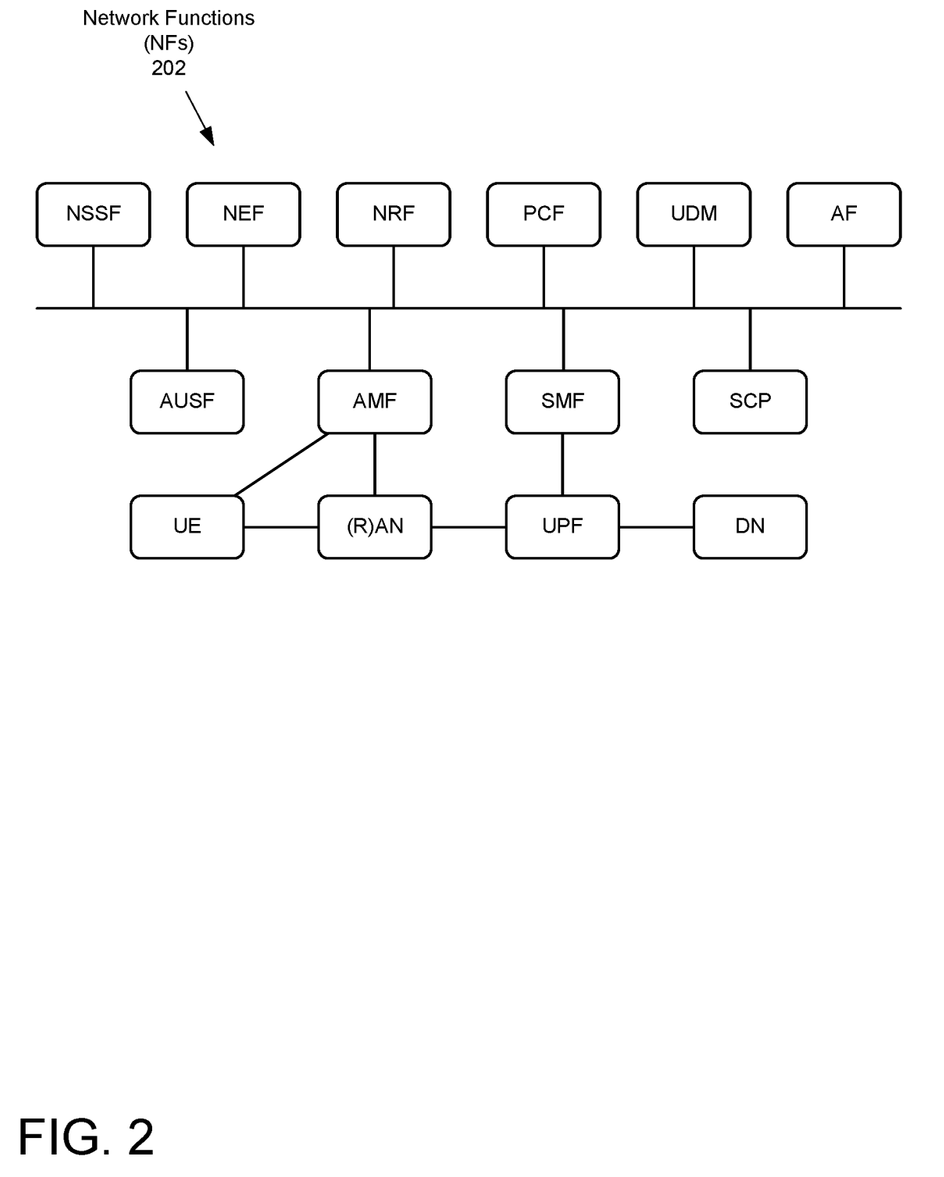
FIG. 2 depicts an example system architecture for a fifth generation (5G) telecommunication network.

FIG. 2 depicts an example system architecture for a fifth generation (5G) telecommunication network. In some examples, the telecommunication network can comprise the 5G core network 110 in FIG. 1 that includes a service-based system architecture in which different types of network functions (NFs) 202 operate alone and/or together to implement services. Standards for 5G communications define many types of NFs 202 that can be present in 5G telecommunication networks (e.g., the 5G core network 110), including but not limited to an Authentication Server Function (AUSF), Access and Mobility Management Function (AMF), Data Network (DN), Unstructured Data Storage Function (UDSF), Network Exposure Function (NEF), Network Repository Function (NRF), Network Slice Selection Function (NSSF), Policy Control Function (PCF), Session Management Function (SMF), Unified Data Management (UDM), Unified Data Repository (UDR), User Plane Function (UPF), Application Function (AF), User Equipment (UE), (Radio) Access Network ((R)AN), 5G-Equipment Identity Register (5G-EIR), Network Data Analytics Function (NWDAF), Charging Function (CHF), Service Communication Proxy (SCP), Security Edge Protection Proxy (SEPP), Non-3GPP InterWorking Function (N3IWF), Trusted Non-3GPP Gateway Function (TNGF), and Wireline Access Gateway Function (W-AGF), many of which are shown in the example system architecture of FIG. 2.

One or more of the NFs 202 of the 5G core network 110 can be implemented as network applications that execute within containers (not shown). The NFs 202 can execute as hardware elements, software elements, and/or combinations of the two within telecommunication network(s), and accordingly many types of the NFs 202 can be implemented as software and/or as virtualized functions that execute on cloud servers or other computing devices. Network applications that can execute within containers can also include any other type of network function, application, entity, module, element, or node.

The 5G core network 110 can, in some examples, determine a connection between an IMS that manages a communication session for the UE 102, including sessions for short messaging, voice calls, video calls, and/or other types of communications. For example, the UE 102 and the IMS of the 5G system 104 (or the IMS 126) can exchange Session Initiation Protocol (SIP) messages to set up and manage individual communication sessions. In some examples, the IMS of the 5G system 104 (or the IMS 126) can generate a communication channel for a voice communication between the UE 102 and the UE 108.

Figure 3:
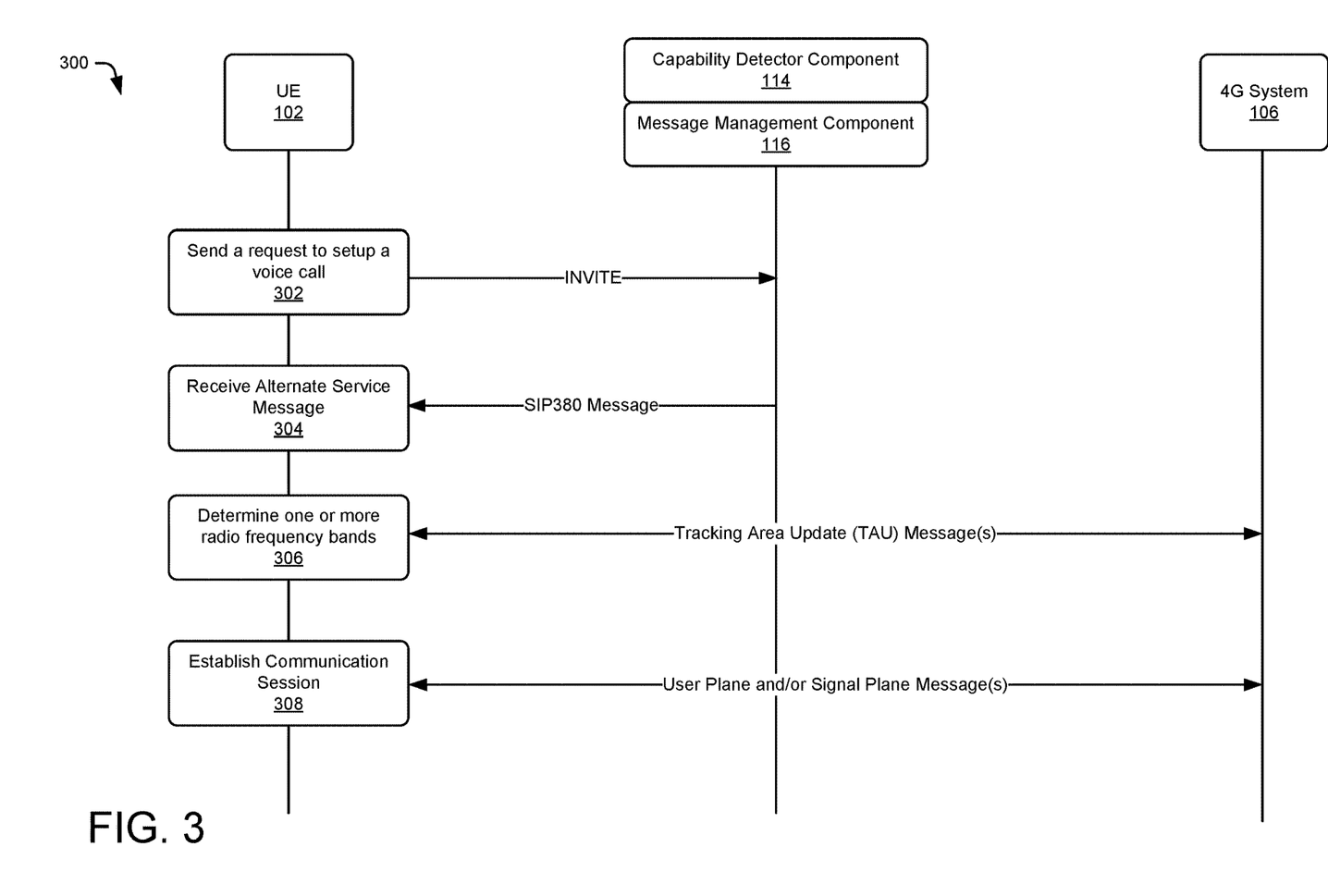
FIG. 3 depicts an example user equipment (UE) implementing call setup techniques to establish a voice call in an example telecommunication network.

FIG. 3 depicts an example user equipment implementing call setup techniques to establish a voice call in an example telecommunication system. For example, the UE 102 may exchange (e.g., send and/or receive) one or more call setup messages with the capability detector component 114, the message management component 116, and the 4G system 106 to establish a communication session with another UE (e.g., the UE 108). The capability detector component 114 and the message management component 116 can be included in an IMS, a PCSCF, or other component of the 5G system 104 that is configured to determine a communication channel for a voice call initiated by the UE 102.

At 302, the UE 102 can send a request to setup a voice call over the 5G core network 110 to the IMS of the 5G system 104. For example, the UE can send one or more call setup messages comprising a call setup instruction, a reply to the call setup instruction, a test message, or other message usable to connect the UE 102 and the UE 108 for voice communication. The call setup instruction can include, for example, a Session Initiation Protocol (SIP) INVITE message or other message requesting a communication channel from the IMS.

In some examples, the capability detector component 114 can identify a PANI, an IMEI, or other device identifier in the SIP INVITE message usable to determine whether the UE 102 includes hardware, software, and/or firmware sufficient for establishing a VoNR call over the 5G core network 110. In some examples, the UE 102 can be operating on a 5G standalone network but lack a chipset, memory, processor, or other computational resource sufficient for the VoNR call. The capability detector component 114 can compare information associated with the PANI and/or the IMEI with a list of devices that are unable to place a VoNR call.

In examples that the PANI and/or the IMEI indicate that the UE 102 is unable to complete the VONR call due to a technological deficiency, the message management component 116 can configure an alternative service message for sending to the UE 102. For example, the message management component 116 can generate a message to indicate that the UE 102 should use the 4G system 106 to complete the voice call request based at least in part on an output of the capability detector component 114.

At 304 the UE 102 can receive the alternative service message (e.g., a SIP 380 message) from the message management component 116 indicating that the voice call should be established on the 4G system 106. Responsive to receiving the alternative service message at 304, the UE 102 can, at 306, determine one or more radio frequency bands on the 4G core network 124 usable for establishing the communication session. For instance, the UE 102 can initiate a Tracking Area Update (TAU) procedure that includes exchanging one or more messages between the UE 102 and the 4G system 106. Generally, the operation at 306 can represent the UE 102 initiating EPSFB fallback to the 4G system 106 based at least in part on receiving the alternative service message. In this way, steps associated with a standardized EPSFB call flow can be delayed, paused, or avoided based at least in part on the capability detector component 114 determining that EPSFB is unavoidable. For instance, the UE 102 does not need to wait for a series of messages to be exchanged in order for a base station of the 5G core network 110 to inform the UE 102 that fallback will occur, as in a standardized EPSFB call flow. Instead, messages exchanged between an AMF, an SMF, a PCF, a UE, and/or base station (e.g., a session modification request, context release command, a TAU request, or other connection setup message) can be paused by one or more of the AMF, the SMF, the PCF, the UE, and/or the base station receiving a message from the message management component 116 indicating that the UE 102 will initiate fallback by receiving the alternative service message. The message may indicate a time period to delay processing by the respective component (e.g., the SMF can delay processing a bearer setup request which can further cause downstream components to avoid receiving or responding to such a request).

Based at least in part on receiving the alternate service message at 304, the UE 102 can initiate one or more tests to determine available radio frequency bands at 306. For example, the UE 102 (and/or the 4G system 106) can perform one or more tests that generate test data representing a signal strength measurement or signal quality measurement. The test data can be a test result associated with a test or event indicating that: signal strength of a serving node (e.g., base station, etc.) becomes better than a threshold, signal strength of the serving node becomes worse than a threshold, a neighboring serving node becomes better than a threshold, the neighboring serving node becomes worse than a threshold, and/or an Inter Radio Access Technology neighbor becomes better than a threshold.

In some examples, the test data may, for example, be associated with a measurement of an Inter Frequency Hand Over event and/or an Inter Radio Access Technology event, just to name a few. The test data can, in various examples, represent one or more of: a Reference Signal Received Power measurement, a Received Signal Strength Indicator measurement, or a Reference Signal Received Quality measurement.

Upon the 4G core network 124 sending an indication of a radio frequency to the UE 102, the UE 102 can establish a communication session at 308 using the 4G system 106. For instance, the operation 308 can include the UE 102 exchanging message(s) with the IMS of the 5G system 104 (or a component thereof) and/or an the IMS 126 of the 4G system 106 to establish a user plane and/or a signal plane usable as part of the communication session. In some examples, establishing the communication session at 308 can include one or more message exchanges by the AMF, the SMF, the PCF, the UE, a base station of the 4G system 106, an MME, and/or a base station of the 5G system 104.

In some example, the message exchanges can include exchanging a message associated with a Modified Bearer Request (MBR), a Dedicated Bearer, or a Create Bearer Request (CBR). Establishing the communication session at 308 can also or instead include setting up a QC-1 user plane by an SMF. In such examples, the SMF can initiate setting up the QC-1 user plane based at least in part on expiration of the aforementioned time delay period or a message received from the UE 102 and/or the IMS indicating that the UE 102 is associated with a particular radio frequency of the 4G system 106.

While FIG. 3 shows message data exchanging between the capability detector component 114, the message management component 116, and the 4G system 106, it is understood that the message data can also or instead be exchanged between a component of the 5G system 104 (e.g., an IMS, a PCSCF, a base station or other network element, etc.) and a component of the 4G system 106 (e.g., an IMS, a PCSCF, a base station or other network element, etc.).

Though the capability detector component 114 and the message management component 116 are illustrated in FIG. 3 individually, it is understood that the capability detector component 114 and the message management component 116 (or functionality provided therefrom) may be directly coupled to and/or integrated into an IMS of the 5G system 104, the IMS 126 of the 4G system, and/or a component of the UE 102. In one specific example, the call setup techniques described herein can be implemented as logic (e.g., programmable code) stored in a PCSCF of the 5G system 104.

Figure 4:
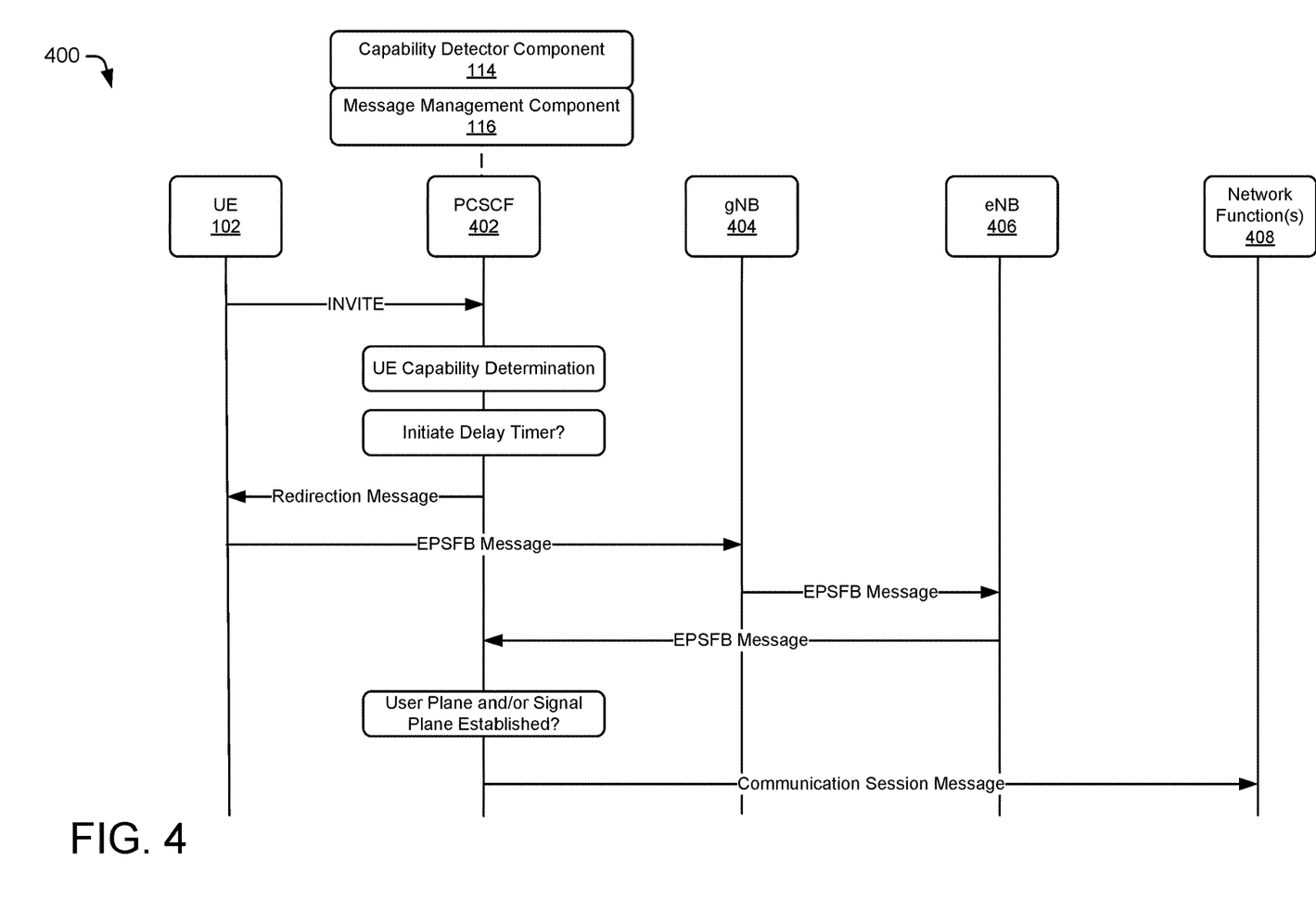
FIG. 4 depicts a messaging flow during an example call setup through an example Proxy Call Session Control Function (PCSCF).

FIG. 4 depicts a messaging flow 400 during an example call setup through an example Proxy Call Session Control Function (PCSCF). For instance, the UE 102 can initiate a voice communication to another UE using the 5G core network 110. In some examples, the messaging flow 400 as shown in FIG. 4 can represent activity to establish a communication session between the UE 102 and the UE 108 by exchanging messages between the UE 102, a PCSCF 402 of the 5G system 104, a gNB 404 of the 5G system 104, a eNB 406 of the 4G system 106, and one or more network functions 408 of the 5G system 104. In various examples, the PCSCF 402 can include functionality of the server 112, the capability detector component 114, and the message management component 116.

The messaging flow 400 can include the UE 102 initiating a voice call by sending a SIP INVITE message to the PCSCF 402 which can implement the capability detector component 114 to determine a capability of the UE 102 for completing the voice call using VoNR. Based at least in part on device information (e.g., a PANI, IMEI, etc.) associated with the SIP INVITE message, the capability detector component 114 can access a lookup table, capability map, or other data indicating technological capabilities of the UE 102. For instance, the capability detector component 114 can access data listing devices by the PANI and/or the IMEI that are unable to use VoNR.

In some examples, the capability detector component 114 can request, access, or receive data from a Unified Data Management (UDM) indicative of the device information. For instance, the capability detector component 114 can identify the IMEI, or other device information associated with the UE 102, based at least in part on exchanging data with the UDM. In one specific example, the capability detector component 114 can determine the PANI from the SIP INVITE received from the UE 102, and determine the IMEI from data received from the UDM as a result of a query initiated by the capability detector component 114.

In addition to determining a capability of the UE 102, the PCSCF 402 can determine whether to initiate a delay timer for one or more components of the 5G system 104. For example, the message management component 116 can generate a message for sending to a component of the IMS of the 5G system 104 to cause the component to pause or delay processing for a pre-determined time period. In some examples, the PCSCF 402 can determine a length of the time period to correspond to a time for the component to process a number of call setup messages. For instance, the PCSCF 402 can cause the SMF to delay processing for a sufficient time to avoid sending or receiving messages that eventually leads to fallback given that the PCSCF 402 is already aware that the UE 102 will fallback to the 4G system 106.

In some examples, the message flow 400 can include the message management component 116 generating a redirection message indicating that the UE 102 is unable to use VoNR, and that a communication session should be directed to the 4G system 106. The UE 102 can receive the redirection message (e.g., a SIP380 message, alternative service message, or other message indicating that the UE 102 will be redirected from the 5G system 104 to the 4G system 106) based at least in part on the PCSCF 402 determining that the UE 102 is unable to complete the VoNR call. Based at least in part on receiving the redirection message, the UE 102 can send a EPSFB message to the gNB 404 to notify the base station that the 4G system will instead be used for the voice call. Accordingly, the gNB 404 can send a same or different ESPFB message to the eNB 406 to cause the UE 102 to fallback to the 4G system 106.

The message flow 400 can include, for example, the gNB 404 sending a fallback message (e.g., a message to cause indicate and/or cause fallback) to an AMF and/or an SMF of a 5G telecommunications network (e.g., the 5G core network 110) to indicate that a 4G telecommunications network (e.g., the 4G core network 124) will establish the communication session. In this way, the gNB 404 can send an indication to the AMF and/or the SMF to initiate and/or complete EPSFB to establish the communication session.

The messaging flow 400 as shown in FIG. 4 can include the eNB 406 sending another ESPFB message to the PCSCF 402 indicating a radio frequency for the UE 102 to use for the voice call. The PCSCF 402 can verify if a user plane and/or a signal plane has been established based at least in part on receiving the EPSFB message from the eNB 406. If the user plane and/or the signal plane has not been established, the PCSCF 402 can send a communication session message to one or more network functions 408 (one of the network functions 202 such as an SMF, an AMF, etc.) to cause the network function(s) 408 to establish the communication session by establishing the user plane and/or the signal plane.

In some examples, the PCSCF 402 can pause standardized call setup messages from being sent for a period of time after sending the redirection message. For example, the PCSCF 402 can implement the message management component 116 to configure a message for sending to a network function (e.g., an SMF) that causes the network function to delay, pause, or otherwise refrain from processing a standardized call setup message. By sending the message to instruct a network function to refrain from processing a message (e.g., send or receive), the PCSCF 402 can ensure that the UE 102 initiates EPSFB without potentially conflicting messages being processed. In such examples, at the end of the time period, functionality of the network function can commence and may include setting up a user plane and/or signal plane.

Figure 5:
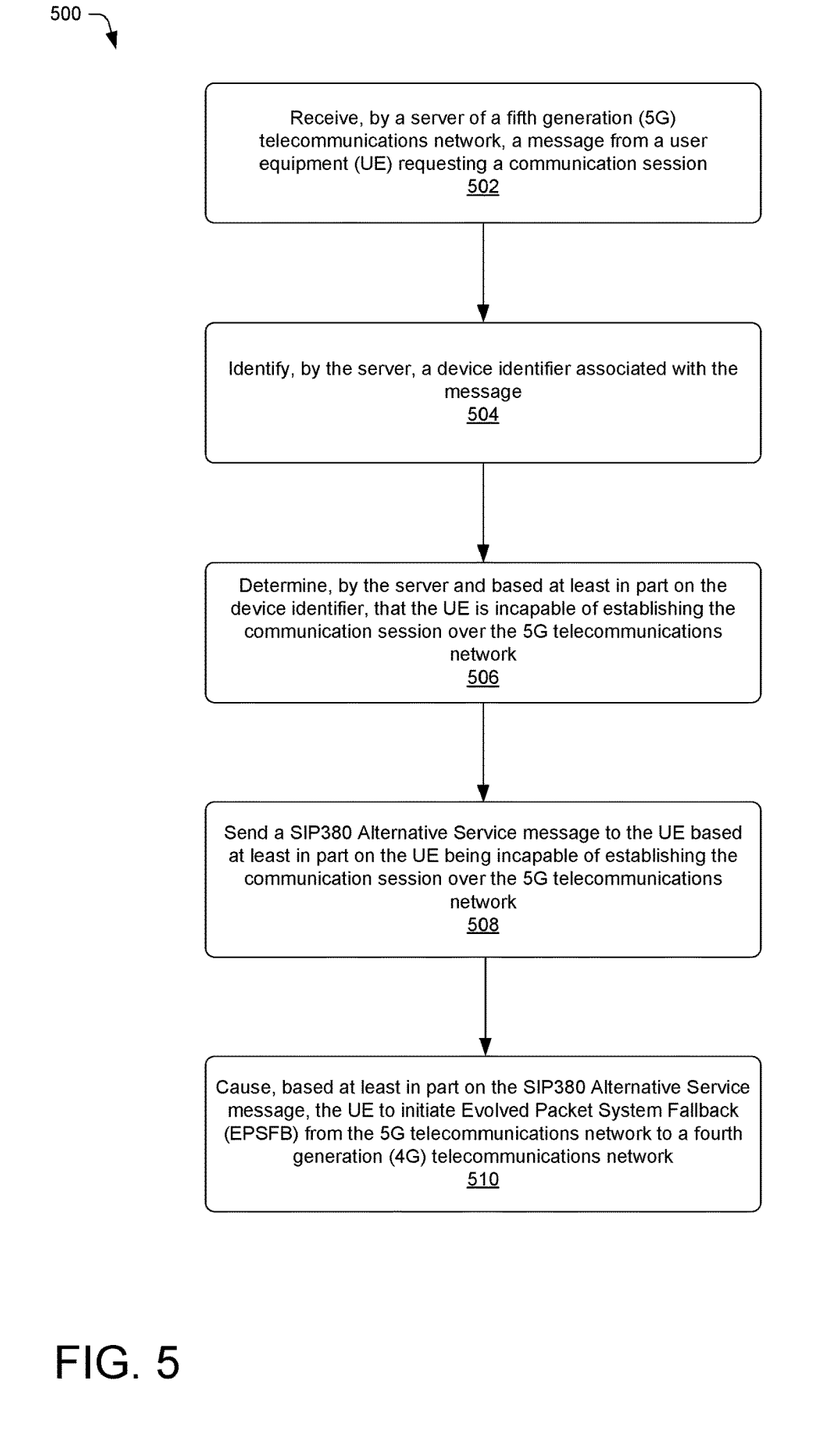
FIG. 5 depicts a flowchart of an example process for establishing a voice call for an example user equipment.

FIG. 5 depicts a flowchart of an example process 500 for establishing a voice call for an example user equipment. Some or all of the process 500 may be performed by one or more components in FIGS. 1-4, as described herein. For example, some or all of process 500 may be performed by the server 112 of FIG. 1 or the PCSCF 402 of FIG. 4.

At operation 502, the process may include receiving, by a server of a fifth generation (5G) telecommunications network, a message from a user equipment (UE) requesting a communication session. In some examples, the operation 502 may include the server 112 receiving SIP INVITE message data indicating that the UE initiated a voice call (e.g., a VoNR communication) to another UE and requests that a communication session be established to facilitate the voice call.

At operation 504, the process may include identifying, by the server, a device identifier associated with the message. For instance, the server 112 can extract, identify, or otherwise determine a PANI, an IMEI, or other device identifier, associated with the SIP INVITE message data. In various examples, the server 112 can implement the capability detector component 114 to identify a PANI and/or an IMEI of the UE 102 based at least in part on information included in the SIP INVITE message data.

At operation 506, the process may include determining, by the server and based at least in part on the device identifier, that the UE is incapable of establishing the communication session over the 5G telecommunications network. In some examples, the operation 506 may include the server 112 determining, based at least in part on the PANI and/or the IMEI, that the UE 102 is unable to complete a VoNR call due to the UE 102 lacking a computational resource capable of establishing the VoNR call on the 5G core network 110. The server 112, may, for instance, compare the device identifier information to information stored in a memory or other storage location indicating which devices (by PANI and/or IMEI) do not have the technological resources required to place the VoNR call.

In some examples, the operation 506 may include the server 112 determining, based at least in part on the device identifier, a radio frequency band or a radio technology usable by the UE to establish the communication session at a future time. In such examples, the server 112 can compare, as a comparison, the radio frequency band or the radio technology to a frequency band or a technology of the 5G telecommunications network, and determining that the UE is incapable of establishing the communication session over the 5G telecommunications network based at least in part on the comparison. That is, the server 112 can compare radio frequency bands or radio technologies available to the UE 102 to radio frequency bands or radio technologies provided by the 5G core network 110 and/or the 4G core network 124 to determine that the communication session should be established on the 4G core network 124.

At operation 508, the process may include sending a SIP380 Alternative Service message to the UE based at least in part on the UE being incapable of establishing the communication session over the 5G telecommunications network. In some examples, the operation 508 may include the server 112 implementing the message management component 116 to generate the SIP380 Alternative Service message for sending to the UE 102 to indicate that an alternative service is available (e.g., fallback to the 4G system 106 will be needed to establish the voice call). Though discussed in the context of a SIP 380 message, in other examples a different alternative service message can be used to indicate that the UE 102 will be redirected to the 4G system 106.

At operation 510, the process may include causing, based at least in part on the SIP380 Alternative Service message, the UE to initiate Evolved Packet System Fallback (EPSFB) from the 5G telecommunications network to a fourth generation (4G) telecommunications network. In some examples, the operation 510 may include the UE 102 initiating one or more tests usable for determining a radio frequency or other channel available to the UE 102 using the 4G core network 124. In some examples, the UE 102 can initiate a request for signal information from a network element or other component of the 4G core network 124. In some examples, the UE 102 can exchange call setup instructions with an AMF, an SMF, a PCF, an MME, or other component, to establish the communication session over the 4G core network 124. For instance, the UE 102 can initiate EPSFB by sending one or more messages to a gNB (e.g., the gNB 404), an eNB (e.g., the eNB 406), another network element, and/or a network function (e.g., network function(s) 408).

Figure 6:
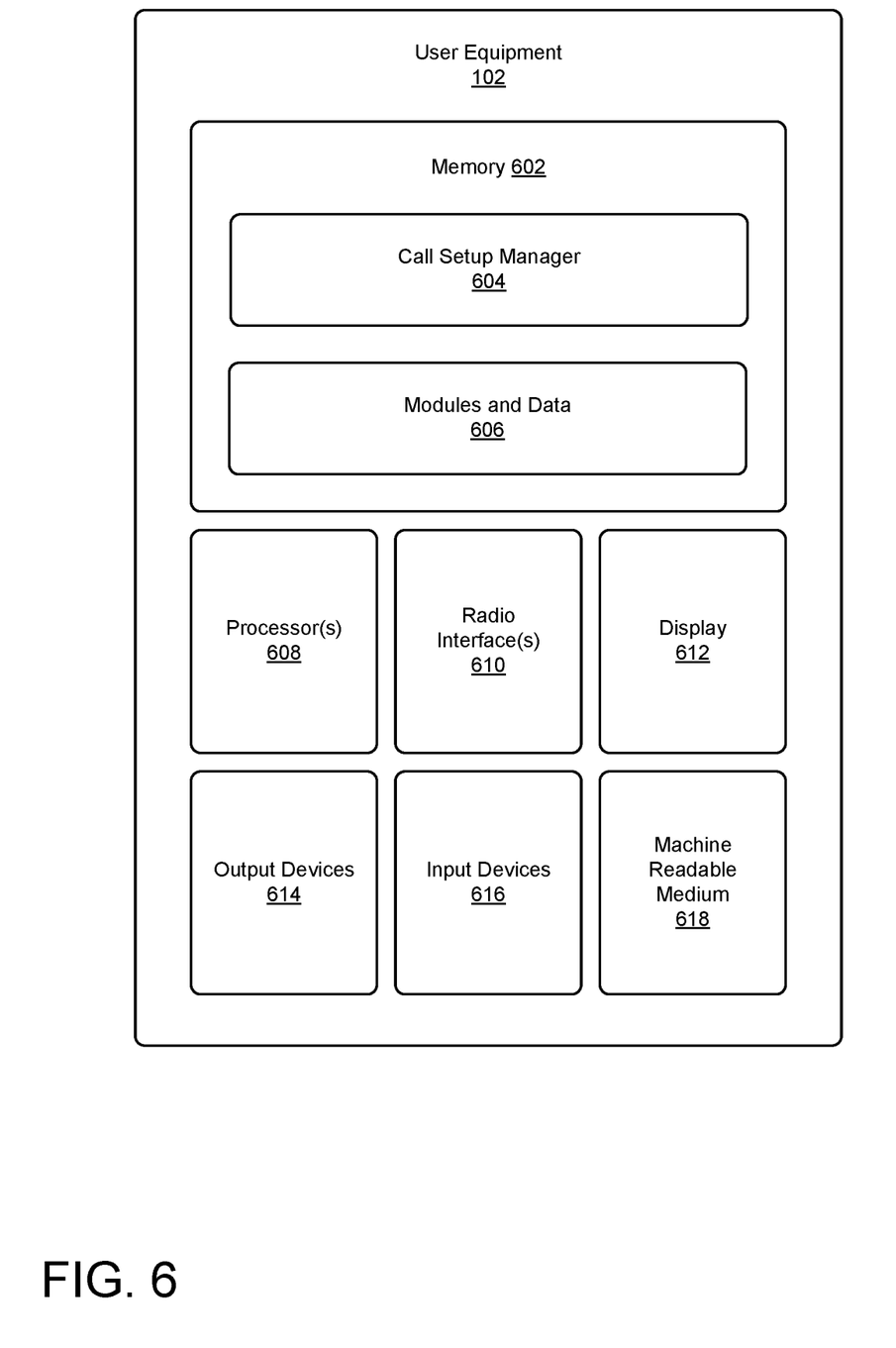
FIG. 6 depicts an example system architecture for a user equipment.

FIG. 6 depicts an example system architecture for a UE 102, in accordance with various examples. As shown, a UE 102 can have memory 602 storing a call setup manager 604, and other modules and data 606. A UE 102 can also comprise processor(s) 608, radio interfaces 610, a display 612, output devices 614, input devices 616, and/or a machine readable medium 618.

In various examples, the memory 602 can include system memory, which may be volatile (such as RAM), non-volatile (such as ROM, flash memory, etc.) or some combination of the two. The memory 602 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the UE 102. Any such non-transitory computer-readable media may be part of the UE 102.

The call setup manager 604 can send and/or receive messages comprising a VoNR service, a ViNR service, and/or an RCS service including SIP messages associated with setup and management of a call session via the IMS. The SIP messages can include an SIP INVITE message and/or other SIP messages.

The other modules and data 606 can be utilized by the UE 102 to perform or enable performing any action taken by the UE 102. The modules and data 606 can include a UE platform, operating system, and applications, and data utilized by the platform, operating system, and applications.

In various examples, the processor(s) 608 can be a central processing unit (CPU), a graphics processing unit (GPU), or both CPU and GPU, or any other type of processing unit. Each of the one or more processor(s) 608 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 608 may also be responsible for executing all computer applications stored in the memory 602, which can be associated with common types of volatile (RAM) and/or nonvolatile (ROM) memory.

The radio interfaces 610 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the radio interfaces 610 can be compatible with multiple radio access technologies, such as 5G radio access technologies and 4G/LTE radio access technologies. Accordingly, the radio interfaces 610 can allow the UE 102 to connect to the 5G system 104 and/or the 4G system 106 as described herein.

The display 612 can be a liquid crystal display or any other type of display commonly used in UEs. For example, display 612 may be a touch-sensitive display screen, and can then also act as an input device or keypad, such as for providing a soft-key keyboard, navigation buttons, or any other type of input. The output devices 614 can include any sort of output devices known in the art, such as the display 612, speakers, a vibrating mechanism, and/or a tactile feedback mechanism. Output devices 614 can also include ports for one or more peripheral devices, such as headphones, peripheral speakers, and/or a peripheral display. The input devices 616 can include any sort of input devices known in the art. For example, input devices 616 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 618 can store one or more sets of instructions, such as software or firmware, that embodies any one or more of the methodologies or functions described herein. The instructions can also reside, completely or at least partially, within the memory 602, processor(s) 608, and/or radio interface(s) 610 during execution thereof by the UE 102. The memory 602 and the processor(s) 608 also can constitute machine readable media 618.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations and equivalents thereof are included within the scope of the techniques described herein. For instance, techniques described in FIGS. 5 and 6 can be combined in various ways.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
receiving, by a server of a fifth generation (5G) telecommunications network, a message from a user equipment (UE) requesting a communication session, wherein the server is a proxy call session control function (PCSCF) associated with an Internet Protocol (IP) Multimedia Subsystem (IMS) and the message is a session initiation protocol (SIP) INVITE;
identifying, by the server, a device identifier associated with the message;
determining, by the server and based at least in part on the device identifier, that the UE is incapable of establishing the communication session over the 5G telecommunications network;
sending, by the server, a SIP380 Alternative Service message to the UE based at least in part on the UE being incapable of establishing the communication session over the 5G telecommunications network; and
causing, based at least in part on the SIP380 Alternative Service message, the UE to initiate Evolved Packet System Fallback (EPSFB) from the 5G telecommunications network to a fourth generation (4G) telecommunications network without waiting for an instruction from a base station of the 5G network, wherein causing the UE to initiate EPSFB from the 5G telecommunications network to the 4G telecommunications network is performed before the UE receives a call setup instruction from the base station of the 5G telecommunications network.

2. The method of claim 1, further comprising:
determining, by the server, a time period to delay processing the call setup instruction associated with the message,
wherein the SIP380 Alternative Service message is sent during the time period.

3. The method of claim 1, wherein:
the message comprises a request to establish a Voice over New Radio (VONR) communication session, and
determining that the UE is incapable of establishing the communication session over the 5G telecommunications network comprises determining that the UE is unable to establish the VoNR communication session.

4. The method of claim 1, wherein:
the device identifier comprises in a P-Access-Network-Information (PANI) or an International Mobile Equipment Identity (IMEI) associated with the UE.

5. The method of claim 1, wherein:
causing the UE to initiate EPSFB comprises causing the UE to send a Session Initiation Protocol message to the 4G telecommunications network based at least in part on the SIP380 Alternative Service message.

6. The method of claim 1, wherein:
the 5G telecommunications network is a 5G standalone (SA) network, and
causing the UE to initiate EPSFB is performed independent of the UE receiving the call setup instruction from a base station associated with the 5G SA network.

7. The method of claim 1, wherein determining that the UE is incapable of establishing the communication session over the 5G telecommunications network comprises:
determining, based at least in part on the device identifier, a radio frequency band or a radio technology usable by the UE to establish the communication session at a future time;
comparing, as a comparison, the radio frequency band or the radio technology to a frequency band or a technology of the 5G telecommunications network; and
determining that the UE is incapable of establishing the communication session over the 5G telecommunications network based at least in part on the comparison.

8. The method of claim 1, wherein the message is a first message, and further comprising:
causing the UE to send a second message to the base station of the 5G telecommunications network, the second message requesting that the base station begin fallback to the 4G telecommunications network; and
causing the base station of the 5G telecommunications network to send the call setup instruction to an IMS of the 4G telecommunications network to establish the communication session.

9. The method of claim 8, further comprising:
causing the base station of the 5G telecommunications network to send a fallback message to an Access and Mobility Management Function (AMF) or a Session Management Function (SMF) of the 5G telecommunications network, the fallback message indicating that the 4G telecommunications network will establish the communication session.

10. A system comprising:
one or more processors; and
memory storing computer-executable instructions that, when executed by the one or more processors, cause the system to perform operations comprising:
receiving, by a server of a first telecommunications network, a message from a user equipment (UE) requesting a communication session, wherein the server is a proxy call session control function (PCSCF) associated with an Internet Protocol (IP) Multimedia Subsystem (IMS) and the message is a session initiation protocol (SIP) INVITE;
identifying, by the server, a device identifier associated with the message;
determining, by the server and based at least in part on the device identifier, that the UE is incapable of establishing the communication session over the first telecommunications network;
sending, by the server, an Alternative Service message to the UE based at least in part on the UE being incapable of establishing the communication session over the first telecommunications network; and
causing, based at least in part on the Alternative Service message, the UE to initiate operating on a second network different from the first telecommunications network without waiting for an instruction from a base station of the first telecommunications network, wherein causing the UE to initiate operating on the second network is performed before the UE receives a call setup instruction from the base station of the first telecommunications network.

11. The system of claim 10, wherein:
the Alternative Service message comprises a SIP380 message,
the first telecommunications network comprises a fifth generation telecommunications network,
the second network comprises a fourth generation telecommunications network, and
causing the UE to initiate operating on the second network comprises causing the UE to initiate Evolved Packet System Fallback (EPSFB) from the fifth generation telecommunications network to the fourth generation telecommunications network.

12. The system of claim 10, wherein the message is a first message, and the operations further comprise:
delaying processing of the call setup instruction associated with the message for a time period,
wherein the Alternative Service message is sent during the time period.

13. The system of claim 10, wherein:
the device identifier comprises in a P-Access-Network-Information (PANI) or an International Mobile Equipment Identity (IMEI) associated with the UE.

14. The system of claim 10, wherein the message is a first message, and the operations further comprise:
sending, by the server, a second message to an Access and Mobility Management Function (AMF) or a Session Management Function (SMF) of the first telecommunications network, the second message indicating that the UE is establishing the communication session with the second network.

15. One or more non-transitory computer-readable media storing instructions executable by one or more processors, wherein the instructions, when executed, cause the one or more processors to perform operations comprising:
receiving, by a server of a first telecommunications network, a message from a user equipment (UE) requesting a communication session, wherein the server is a proxy call session control function (PCSCF) associated with an Internet Protocol (IP) Multimedia Subsystem (IMS) and the message is a session initiation protocol (SIP) INVITE;
identifying, by the server, a device identifier associated with the message;
determining, by the server and based at least in part on the device identifier, that the UE is incapable of establishing the communication session over the first telecommunications network;
sending, by the server, an Alternative Service message to the UE based at least in part on the UE being incapable of establishing the communication session over the first telecommunications network; and
causing, based at least in part on the Alternative Service message, the UE to initiate operating on a second network different from the first telecommunications network without waiting for an instruction from a base station of the first telecommunications network, wherein causing the UE to initiate operating on the second network is performed before the UE receives a call setup instruction from the base station of the first telecommunications network.

16. The one or more non-transitory computer-readable media of claim 15, wherein the message is a first message and the Alternative Service message comprises a SIP380 message, and the operations further comprise:
delaying processing of a call setup instruction associated with the message for a time period,
wherein the SIP380 message is sent during the time period.

17. The one or more non-transitory computer-readable media of claim 15, the operations further comprising:
causing the UE to send a second message to the base station of the first telecommunications network, the second message requesting that the base station begin fallback to the second network; and
causing the base station of the first telecommunications network to send the call setup instruction to an IMS of the second network to establish the communication session.

18. The one or more non-transitory computer-readable media of claim 15, wherein: causing the UE to initiate EPSFB is performed independent of the UE receiving the call setup instruction from a base station associated with the UE.

19. The one or more non-transitory computer-readable media of claim 15, wherein:
the first telecommunications network comprises a fifth generation telecommunications network,
the second network comprises a fourth generation telecommunications network,
the message comprises a request to establish a Voice over New Radio (VONR) communication session, and
determining that the UE is incapable of establishing the communication session over the fifth generation telecommunications network comprises determining that the UE is unable to establish the VoNR communication session.

20. The one or more non transitory computer readable media of claim 15, wherein the device identifier comprises in a P-Access-Network-Information (PANI) or an International Mobile Equipment Identity (IMEI) associated with the UE.

* * * * *